(12) United States Patent
Izumi et al.

(10) Patent No.: US 11,247,346 B2
(45) Date of Patent: Feb. 15, 2022

(54) GRIPPING MECHANISM AND ASSEMBLY APPARATUS

(71) Applicant: KYOCERA Document Solutions Inc., Osaka (JP)

(72) Inventors: Koji Izumi, Osaka (JP); Hayato Mori, Osaka (JP); Masaru Takagi, Osaka (JP); Tomohiko Yamakawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 107 days.

(21) Appl. No.: 16/799,562

(22) Filed: Feb. 24, 2020

(65) Prior Publication Data

US 2020/0269442 A1 Aug. 27, 2020

(30) Foreign Application Priority Data

Feb. 25, 2019 (JP) .............................. JP2019-032022

(51) Int. Cl.
*B25J 15/06* (2006.01)
*B25J 15/00* (2006.01)

(52) U.S. Cl.
CPC ....... *B25J 15/0608* (2013.01); *B25J 15/0028* (2013.01)

(58) Field of Classification Search
CPC ...... B23P 19/007; B25J 9/0096; B25J 9/1055; B25J 15/00; B25J 15/0028; B25J 15/0608; B65G 47/90; B66C 1/422; B66C 1/48; B66C 1/442; Y10S 294/901
See application file for complete search history.

(56) References Cited

U.S. PATENT DOCUMENTS

| | | | | | |
|---|---|---|---|---|---|
| 3,008,749 | A | * | 11/1961 | Gowan | B66C 1/48 294/86.4 |
| 3,197,250 | A | * | 7/1965 | Trotta | B66C 1/48 294/102.1 |
| 3,653,708 | A | * | 4/1972 | Merola | B23Q 7/043 294/102.1 |

(Continued)

FOREIGN PATENT DOCUMENTS

| | | |
|---|---|---|
| CN | 1615240 A | 5/2005 |
| FR | 2947020 A1 | 12/2010 |
| JP | H07-241733 A | 9/1995 |

OTHER PUBLICATIONS

An Office Action mailed by China National Intellectual Property Administration dated Jun. 9, 2021, which corresponds to Chinese Patent Application No. 202010111761.X and is related to U.S. Appl. No. 16/799,562; with English language translation.

*Primary Examiner* — Saul Rodriguez
*Assistant Examiner* — Joseph Aronson
(74) *Attorney, Agent, or Firm* — Studebaker & Brackett PC (57) ABSTRACT

A gripping mechanism includes a holder, a gripping roller, and a lever. The gripping roller is housed within the holder and grips an object between the roller and an inner surface of the holder. The lever releases gripping of the object by pushing the gripping roller upward. Preferably, the holder includes two plate sections which support a weight of the gripping roller. An opening is located between the two plate sections. The opening receives insertion of the object. One of the two plate sections is inclined relative to a vertical direction.

7 Claims, 6 Drawing Sheets

(56) References Cited

U.S. PATENT DOCUMENTS

| | | | | |
|---|---|---|---|---|
| 3,780,923 | A | * | 12/1973 | Merola .................. B25B 1/2473 226/151 |
| 4,831,693 | A | | 5/1989 | Veith et al. |
| 7,412,809 | B2 | | 8/2008 | Yuyama et al. |
| 7,509,713 | B2 | * | 3/2009 | Lewis ....................... F16B 2/16 24/488 |
| 2005/0161875 | A1 | | 7/2005 | Vuyama et al. |
| 2008/0209696 | A1 | | 9/2008 | Lewis |
| 2014/0250651 | A1 | * | 9/2014 | MacDougall ......... B23P 19/007 29/281.5 |
| 2018/0333859 | A1 | * | 11/2018 | Ban ........................ B25J 9/1612 |

* cited by examiner

GRIPPING MECHANISM AND ASSEMBLY APPARATUS

INCORPORATION BY REFERENCE

The present application claims priority under 35 U.S.C. § 119 to Japanese Patent Application No. 2019-032022, filed on Feb. 25, 2019. The contents of this application are incorporated herein by reference in their entirety.

BACKGROUND

The present disclosure relates to a gripping mechanism and an assembly apparatus.

A known assembly apparatus includes a chuck mechanism which grips a member to be conveyed. The chuck mechanism is an electric gripping mechanism. Other gripping mechanisms are known which use air suction or electric suction.

SUMMARY

A gripping mechanism according to an aspect of the present disclosure includes a frame, a roller, and a lever. The roller is housed within the frame and grips an object between the roller and an inner surface of the frame. The lever releases gripping of the object by pushing the roller upward.

An assembly apparatus according to an aspect of the present disclosure is for assembling a first member and a second member. The assembly apparatus includes a gripping mechanism which grips the first member and a drive mechanism which drives the gripping mechanism. The gripping mechanism includes a frame and a roller. The roller is housed within the frame and grips the first member between the roller and an inner surface of the frame. The drive mechanism moves the gripping mechanism relative to the first member such that the first member is gripped by the gripping mechanism. The drive mechanism moves the first member gripped by the gripping mechanism relative to the second member such that the first member and the second member are assembled. The gripping mechanism further includes a lever. The lever releases gripping of the first member by pushing the roller upward.

DETAILED DESCRIPTION

Figure 1:
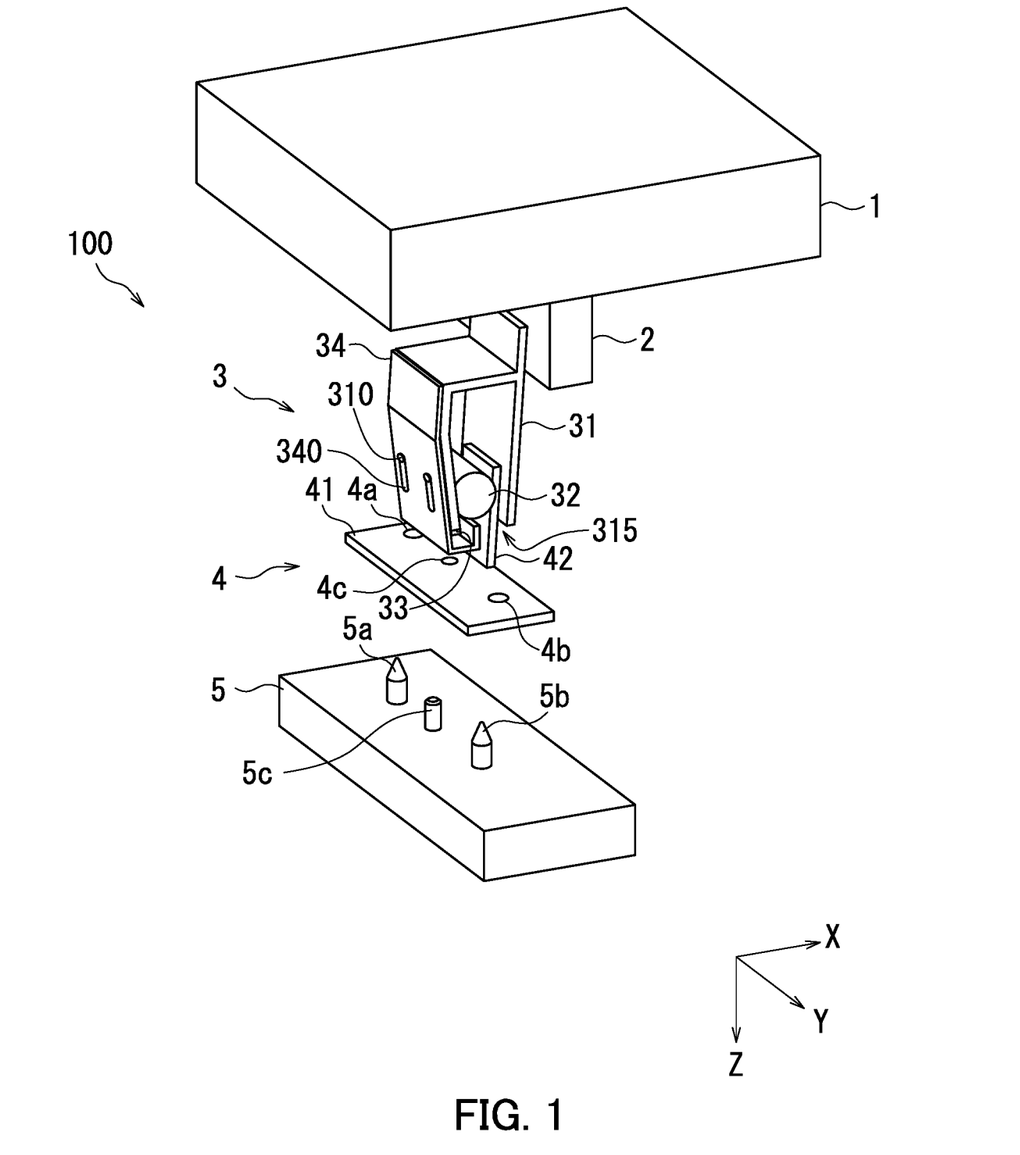
FIG. 1 is a perspective view of an example of a gripping mechanism and an assembly apparatus according to an embodiment of the present disclosure.

The following describes an embodiment of the present disclosure with reference to FIGS. 1 to 6. In FIG. 1, as a matter of convenience, a direction from the front left to the back right is referred to as a positive X axial direction, a direction from the back left to the front right is referred to as a positive Y axial direction, and a direction from up to down is referred to as a positive Z axial direction. Elements which are the same or equivalent are labeled with the same reference signs in the drawings and description thereof is not repeated.

Figure 2:
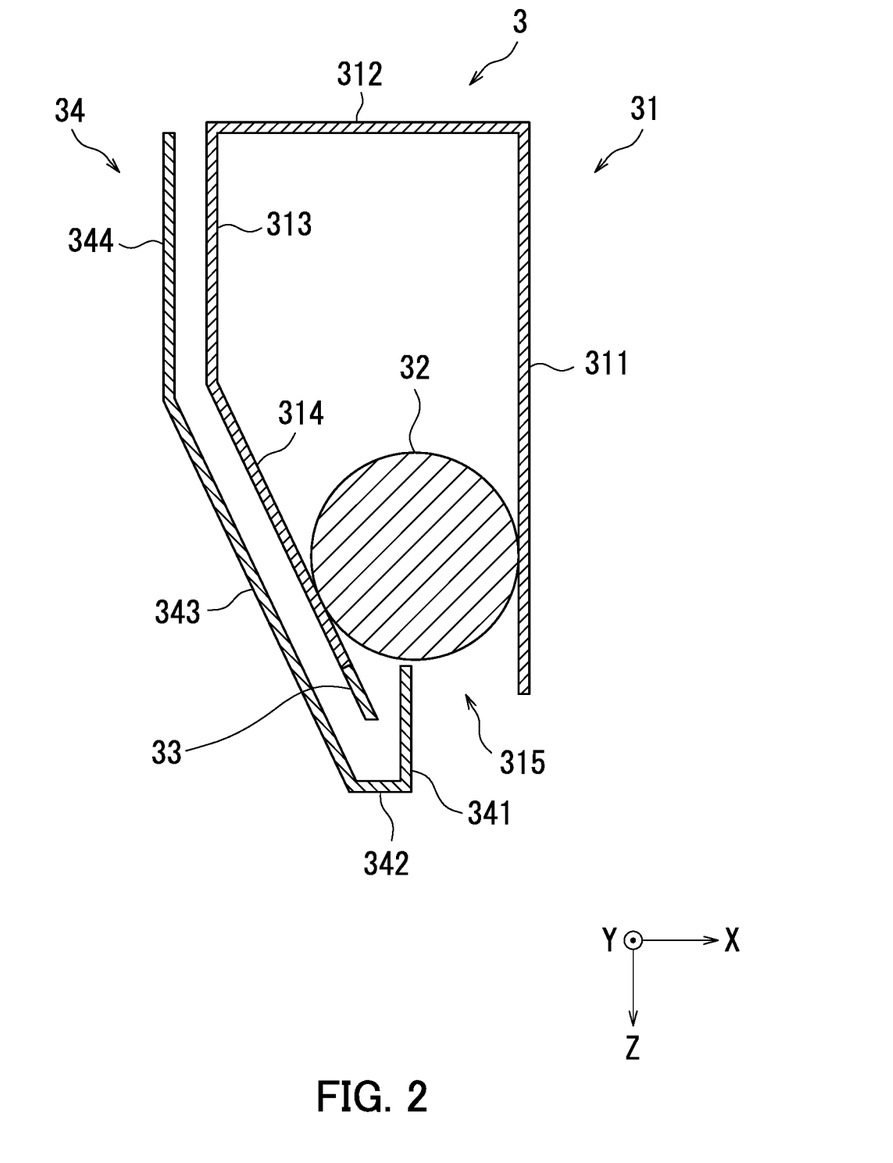
FIG. 2 is a cross-sectional view of the gripping mechanism with a lever in a home position.

First, an assembly apparatus 100 and a gripping mechanism 3 according to the present disclosure are described with reference to FIGS. 1 and 2. FIG. 1 is a perspective view of an example of the assembly apparatus 100 and the gripping mechanism 3 according to the embodiment. FIG. 2 is an enlarged cross-sectional view of only the gripping mechanism 3.

As illustrated in FIG. 1, the assembly apparatus 100 is an apparatus which assembles a first member 4 and a second member 5. The assembly apparatus 100 includes a first drive mechanism 1, a second drive mechanism 2, and the gripping mechanism 3.

The first drive mechanism 1 drives the second drive mechanism 2 and the gripping mechanism 3 in X and Y axial directions. The second drive mechanism 2 drives the gripping mechanism 3 in a Z axial direction. The first drive mechanism 1 and the second drive mechanism 2 are equivalent to an example of a "drive mechanism".

The gripping mechanism 3 grips the first member 4. The gripping mechanism 3 includes a holder 31, a gripping roller 32, a magnet 33, and a lever 34.

As illustrated in FIG. 2, the holder 31 is a frame which houses the gripping roller 32, and has a back plate 311, a top plate 312, an upper front plate 313, and a lower front plate 314. The back plate 311 and the upper front plate 313 extend parallel to each other along a Y-Z plane. The top plate 312 extends along an X-Y plane so as to connect the back plate 311 and the upper front plate 313. The lower front plate 314 extends from the lower edge of the upper front plate 313 diagonally downward in a direction approaching the back plate 311. The back plate 311 is fixed to the second drive mechanism 2. The holder 31 is open on either end in the Y axial direction. The holder 31 has an opening 315 on the lower edge thereof between the back plate 311 and the lower front plate 314. The opening 315 receives an object to be gripped. The holder 31 is equivalent to an example of a "frame".

The gripping roller 32 is a metal cylinder, for example. The central axis of the gripping roller 32 extends parallel to the Y axial direction. The object to be gripped is gripped between the peripheral surface of the gripping roller 32 and the inner surface of the holder 31. The gripping roller 32 is equivalent to an example of a "roller".

The width of the opening 315 in the X axial direction is smaller than the diameter of the gripping roller 32. Accordingly, the gripping roller 32 does not fall through the opening 315. The back plate 311 and the lower front plate 314 support the weight of the gripping roller 32. The lower front plate 314 is inclined relative to the Z axial direction (vertical direction).

The magnet 33 is fixed to the lower edge of the lower front plate 314.

The lever 34 is a plate for pushing the gripping roller 32 upward. As illustrated in FIG. 2, the lever 34 has a vertical portion 344, an inclined portion 343, a horizontal portion 342, and a leading edge portion 341. The vertical portion 344 extends along the upper front plate 313. The inclined portion 343 extends along the lower front plate 314. The horizontal portion 342 extends from the lower edge of the inclined portion 343 in the positive X axial direction. The leading edge portion 341 extends upward from the edge of the horizontal portion 342. The leading edge portion 341 enters the opening 315.

As illustrated in FIG. 1, two pins 310 protruding in the X axial direction are provided in the holder 31. The lever 34 has two long holes 340. The lever 34 is attached to the holder 31 such that the pins 310 are inserted into the long holes 340. As a result, the lever 34 is supported so as to freely move up and down relative to the holder 31. The pins 310 and the long holes 340 are equivalent to an example of a "support mechanism".

The first member 4 includes a member body 41 and a gripped portion 42. The member body 41 and the gripped portion 42 are rectangular plates. The gripped portion 42 is connected to the member body 41 so as to protrude in a direction intersecting with the member body 41 on the edge of one of the main surfaces of the member body 41. The member body 41 has a first hole 4a, a second hole 4b, and a third hole 4c.

The second member 5 has a substantially rectangular parallelepiped main body and is formed by a first boss 5a and a second boss 5b for positioning, and a protrusion 5c for pushing the lever 34 upward. When the first member 4 and the second member 5 are assembled, the first boss 5a penetrates the first hole 4a, the second boss 5b penetrates the second hole 4b, and the protrusion 5c penetrates the third hole 4c.

Next, a home position of the lever 34 is described with reference to FIGS. 1 and 2.

As illustrated in FIG. 2, as the lever 34 descends due to the weight thereof, the lever 34 moves into a low position relative to the holder 31. At this time, as illustrated in FIG. 1, the pins 310 support the lever 34 on the upper ends of the long holes 340. The position of the lever 34 in this case is referred to as the "home position". As illustrated in FIG. 2, when the lever 34 is in the home position, the leading edge portion 341 of the lever 34 is separated from the gripping roller 32. The gripping roller 32 is supported by the back plate 311 and the lower front plate 314 of the holder 31.

Figure 3:
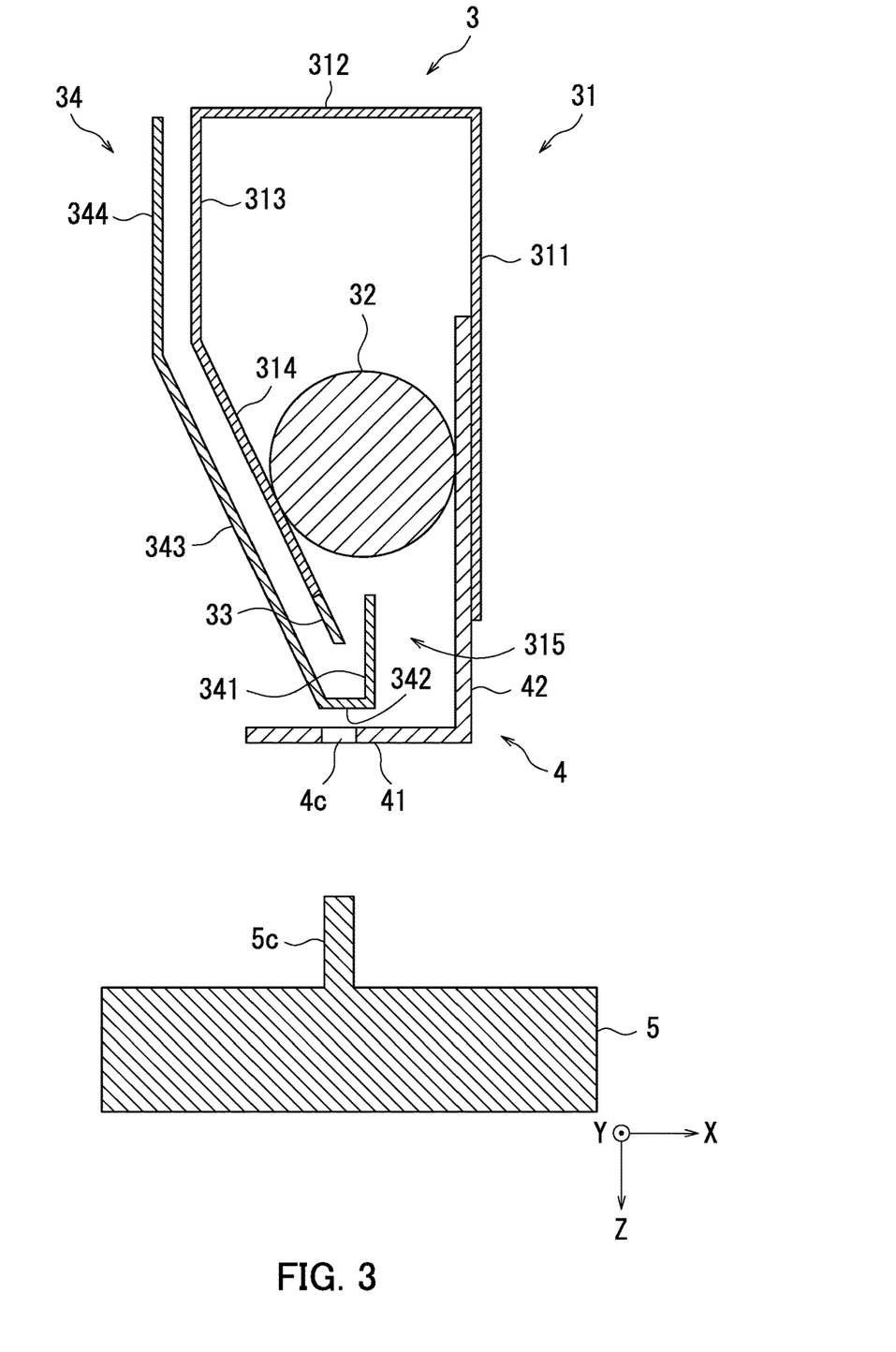
FIG. 3 is a cross-sectional view of the gripping mechanism gripping a first member.

Next, gripping of the first member 4 by the gripping mechanism 3 is described with reference to FIGS. 1 and 3. FIG. 3 is a cross-sectional view of the gripping mechanism 3 gripping the first member 4.

As illustrated in FIG. 3, the gripping mechanism 3 grips the gripped portion 42 between the peripheral surface of the gripping roller 32 and the inner surface of the holder 31 due to gravity acting on the gripping roller 32. The first drive mechanism 1 moves the gripping mechanism 3 to a storage location of the first member 4. The second drive mechanism 2 moves the gripping mechanism 3 in the positive Z axial direction relative to the first member 4. The gripped portion 42 is inserted into the holder 31 through the opening 315 and ascends within the holder 31 while pushing aside the gripping roller 32. The gripping mechanism 3 stops moving when the upper edge of the gripped portion 42 reaches a position higher than the center of the gripping roller 32. As a result, gripping illustrated in FIG. 3 is realized. The first drive mechanism 1 conveys the first member 4 to a position directly above the second member 5 as illustrated in FIGS. 1 and 3 by further moving the gripping mechanism 3. The lever 34 remains in the home position.

Figure 4:
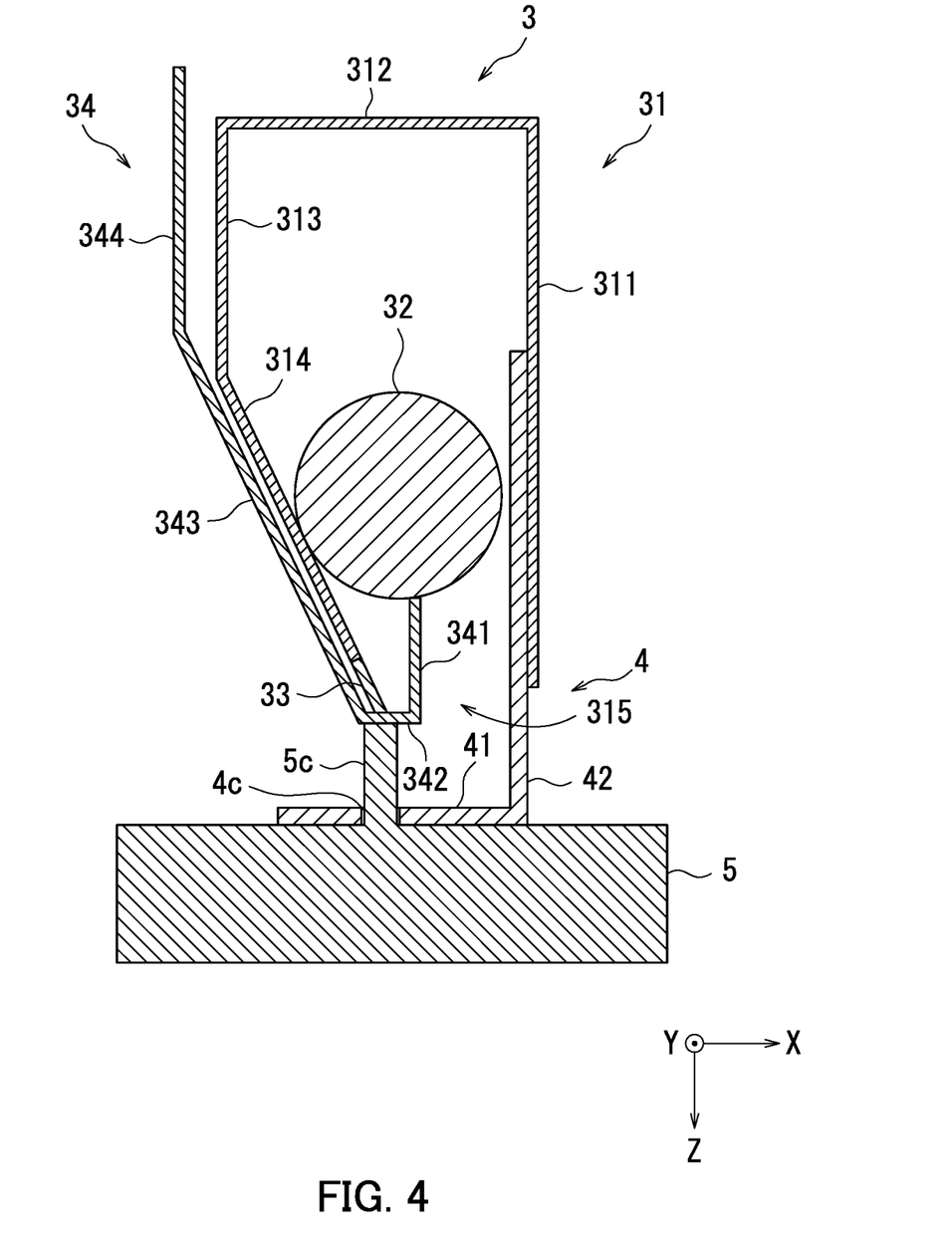
FIG. 4 is a cross-sectional view of the gripping mechanism with the lever in a lifted up position.

Next, a lifted up position of the lever 34 is described with reference to FIGS. 1 and 4. FIG. 4 is a cross-sectional view of the gripping mechanism 3 with the lever 34 in the lifted up position.

As illustrated in FIG. 4, the second drive mechanism 2 moves the gripping mechanism 3 in the positive Z axial direction relative to the second member 5. As a result, assembly of the first member 4 and the second member 5 can be realized. Then, positioning of the first member 4 on the second member 5 is achieved by guiding the first boss 5a into the first hole 4a and the second boss 5b into the second hole 4b. At the same time, the protrusion 5c penetrates the third hole 4c. The protrusion 5c penetrating the third hole 4c pushes the lever 34 upward until the horizontal portion 342 is drawn to the magnet 33. The leading edge portion 341 of the upward pushed lever 34 pushes the gripping roller 32 upward. As a result, clearance occurs between the peripheral surface of the gripping roller 32 and the gripped portion 42, and the gripped portion 42 is released from gripping. The position in which the lever 34 is pushed upward as described above is referred to as a "lifted up position". In the lifted up position, the magnet 33 continues to draw the lever 34 such that the lever 34 keeps pushing the gripping roller 32 upward.

Figure 5:
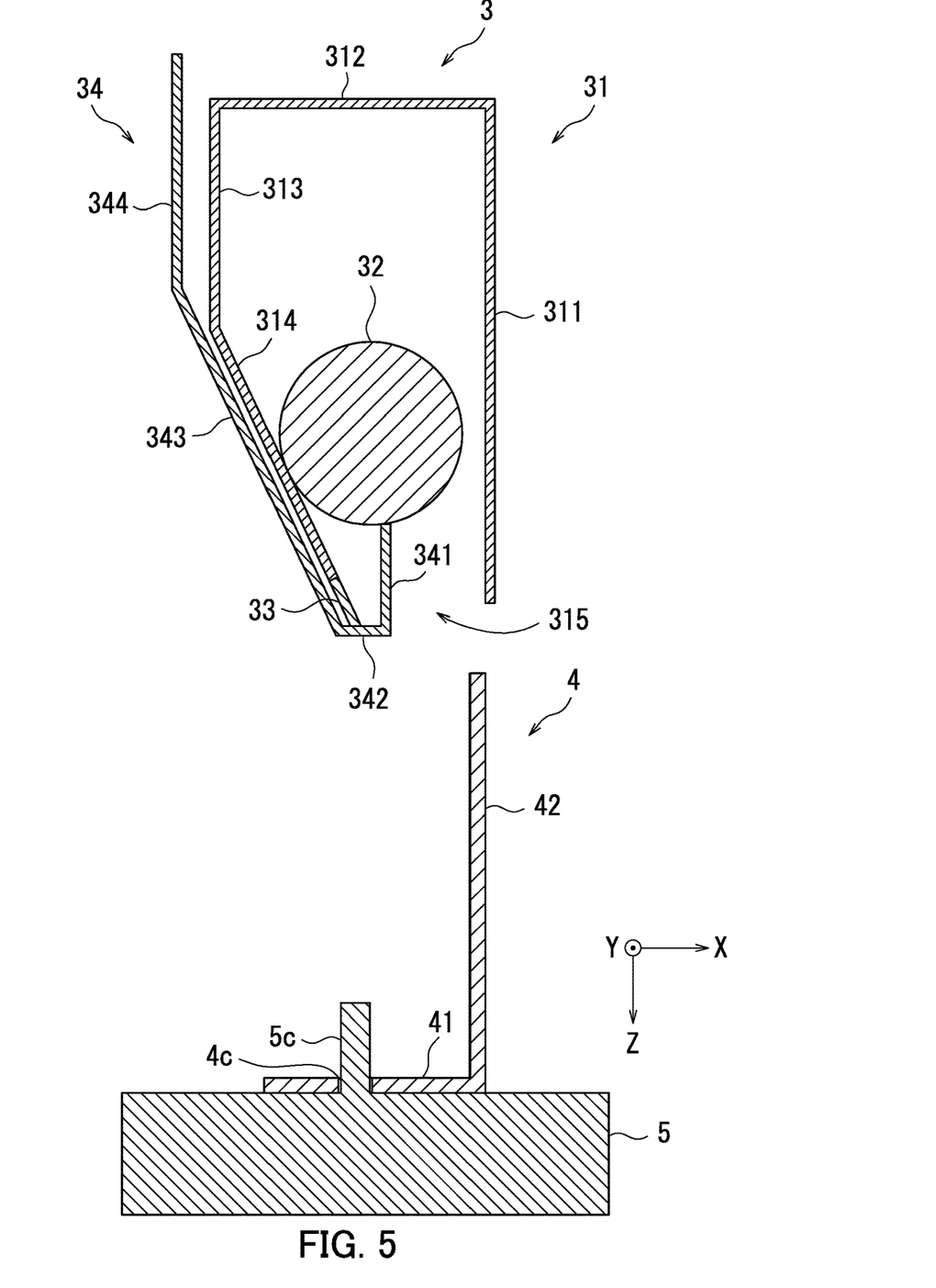
FIG. 5 is a cross-sectional view of the gripping mechanism with the first member separated from the gripping mechanism.

Next, a process through which the first member 4 is separated from the gripping mechanism 3 is described with reference to FIGS. 1 and 5. FIG. 5 is a cross-sectional view of the gripping mechanism 3 with the first member 4 separated from the gripping mechanism 3.

As illustrated in FIG. 5, the second drive mechanism 2 moves the gripping mechanism 3 in a negative Z axial direction relative to the assembled first member 4 and second member 5. As a result, the gripped portion 42 can be removed from within the holder 31 without receiving resistance from the gripping roller 32. The lever 34 stays in the lifted up position.

Figure 6:
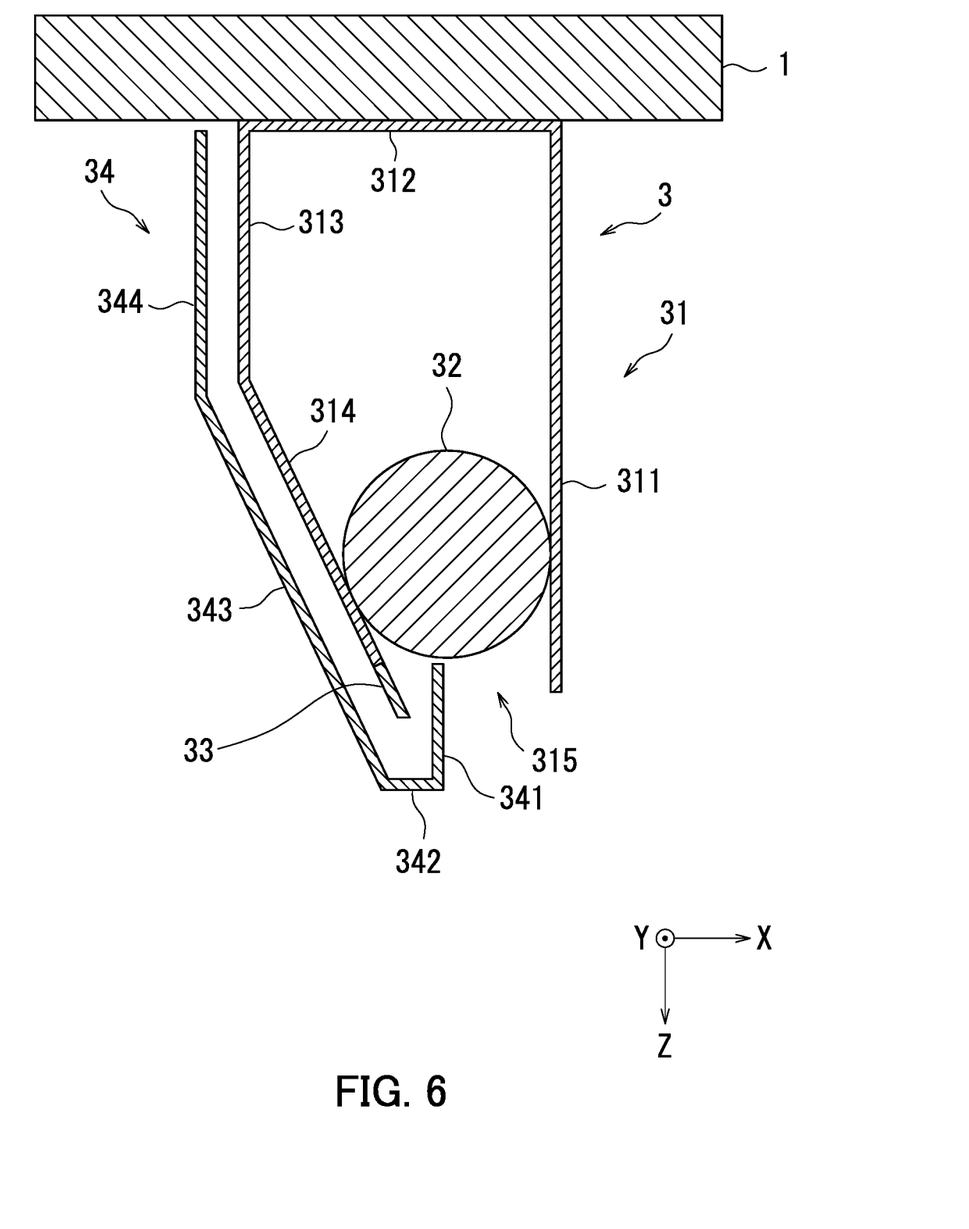
FIG. 6 is a cross-sectional view of the gripping mechanism with the lever returned to the home position.

Lastly, return of the lever 34 to the home position is described with reference to FIGS. 1 and 6. FIG. 6 is a cross-sectional view of the gripping mechanism 3 with the lever 34 returned to the home position.

As illustrated in FIG. 6, the lower surface of the first drive mechanism 1 pushes the lever 34 downward due to the second drive mechanism 2 moving into the first drive mechanism 1. As a result, the lever 34 is released from being drawn to the magnet 33, and the lever 34 returns to the home position due to the weight thereof. The gripping roller 32 is again supported by the back plate 311 and the lower front plate 314. The first drive mechanism 1 is equivalent to an example of a "release mechanism".

According to the embodiment as illustrated in FIG. 1, the gripping mechanism 3 is configured not to require motive power due to use of the gripping roller 32. As a result, a gripping mechanism 3 which does not fail easily can be realized at low cost. Furthermore, the gripped object can be easily released in a limited space through the operation of the lever 34.

The description of the above embodiment is of an ideal embodiment of the present disclosure, and therefore includes various favorable technical limitations. However, the technical scope of the present disclosure is not limited to the embodiment unless specifically described as such. That is, elements of configuration in the above embodiment may be appropriately replaced with existing elements of configuration and the like, and a number of variations including other existing elements of configuration are possible. The description of the above embodiment does not limit the content of the disclosure described in the claims.

For example, in the embodiment, the magnet 33 draws the lever 34 to keep the lever 34 in the lifted up position, but the present disclosure is not limited as such. For example, a mechanism may be provided between the holder 31 and the lever 34 which keeps the lever 34 in the lifted up position by hooking the lever 34 into the holder 31.

What is claimed is:

1. A gripping mechanism comprising:
a frame;
a magnet fixed to the frame;
a roller housed within the frame and configured to grip an object between the roller and an inner surface of the frame; and
a lever configured to release gripping of the object by pushing the roller upward, wherein
the magnet draws the lever such that the lever keeps pushing the roller upward.

2. The gripping mechanism according to claim 1, wherein
the frame has two plate sections which support a weight of the roller,
an opening is located between the two plate sections, the opening receiving insertion of the object, and
one of the two plate sections is inclined relative to a vertical direction.

3. The gripping mechanism according to claim 1, wherein
the frame and the lever include a support mechanism which supports the lever so as to freely move up and down relative to the frame.

4. An assembly apparatus for assembling a first member and a second member, the assembly apparatus comprising:
a gripping mechanism configured to grip the first member; and
a drive mechanism configured to drive the gripping mechanism, wherein
the gripping mechanism includes:
a frame; and
a roller housed within the frame, the roller gripping the first member between the roller and an inner surface of the frame,
the drive mechanism moves the gripping mechanism relative to the first member such that the first member is gripped by the gripping mechanism,
the drive mechanism moves the first member gripped by the gripping mechanism relative to the second member such that the first member and the second member are assembled,
the gripping mechanism further includes a lever which releases gripping of the first member by pushing the roller upward, and
the lever is pushed upward by a protrusion provided on the second member so as to release the gripping of the first member.

5. The assembly apparatus according to claim 4, wherein
the frame includes two plate members which support a weight of the roller,
an opening is located between the two plate sections, the opening receiving insertion of the first member, and
one of the two plate sections is inclined relative to a vertical direction.

6. An assembly apparatus for assembling a first member and a second member, the assembly apparatus comprising:
a gripping mechanism configured to grip the first member; and
a drive mechanism configured to drive the gripping mechanism, wherein
the gripping mechanism includes:
a frame; and
a roller housed within the frame, the roller gripping the first member between the roller and an inner surface of the frame,
the drive mechanism moves the gripping mechanism relative to the first member such that the first member is gripped by the gripping mechanism,
the drive mechanism moves the first member gripped by the gripping mechanism relative to the second member such that the first member and the second member are assembled,
the gripping mechanism further includes a magnet fixed to the frame and a lever that releases gripping of the first member by pushing the roller upward, and
the magnet draws the lever such that the lever keeps pushing the roller upward.

7. The assembly apparatus according to claim 6, wherein
the drive mechanism pushes the lever downward so as to release drawing of the lever by the magnet.

* * * * *